United States Patent
Mittelmeier (10) Patent No.: US 10,927,820 B2
(45) Date of Patent: Feb. 23, 2021

(54) METHOD AND SYSTEM FOR CALIBRATING A WIND VANE

(71) Applicant: SENVION GMBH, Hamburg (DE)

(72) Inventor: Niko Mittelmeier, Hamburg (DE)

(73) Assignee: Senvion GmbH, Hamburg (DE)

( * ) Notice: Subject to any disclaimer, the term of this patent is extended or adjusted under 35 U.S.C. 154(b) by 0 days.

(21) Appl. No.: 16/279,191

(22) Filed: Feb. 19, 2019

(65) Prior Publication Data

US 2019/0360468 A1 Nov. 28, 2019

(30) Foreign Application Priority Data

Feb. 19, 2018 (DE) .................. 10 2018 001 270

(51) Int. Cl.
*F03D 17/00* (2016.01)
*G01P 13/02* (2006.01)
(Continued)

(52) U.S. Cl.
CPC .......... *F03D 17/00* (2016.05); *F03D 7/0204* (2013.01); *G01P 13/02* (2013.01); *G01P 21/00* (2013.01);
(Continued)

(58) Field of Classification Search
CPC ...... F03D 17/00; F03D 7/0204; F03D 7/0212; G01P 5/02; G01P 13/02; G01P 21/00; F05B 2270/802; F05B 2260/80; F05B 2260/83
See application file for complete search history.

(56) References Cited

U.S. PATENT DOCUMENTS

| | | | |
|---|---|---|---|
| 6,993,965 B2* | 2/2006 | Yoshida | G01P 5/06 73/170.01 |
| 7,086,835 B2* | 8/2006 | Yoshida | F03D 7/0204 415/4.3 |

(Continued)

FOREIGN PATENT DOCUMENTS

| | | |
|---|---|---|
| CN | 107577647 | 1/2018 |
| DE | 19934415 | 3/2005 |

(Continued)

OTHER PUBLICATIONS

Keck "A numerical investigation of nacelle anemometry for a HAWT using actuator disc and line models in CFX," Renewable Energy, Apr. 2012, vol. 48, No. 2, pp. 72-84.

(Continued)

*Primary Examiner* — Michael Lebentritt
*Assistant Examiner* — Topaz L. Elliott
(74) *Attorney, Agent, or Firm* — Sheridan Ross P.C.

(57) ABSTRACT

A method and a system for calibrating a wind vane of a wind turbine, a method for monitoring a wind turbine, and a method for operating a wind turbine are provided. The method comprises: measuring first and second wind speeds with anemometers and a wind direction with a wind vane, a multiplicity of measurement values being recorded over a defined time period; determining differences between the first and second wind speeds; determining a model function for a relationship between measured wind directions and determined differences, at least one first model function being determined for a first wind-speed bin and at least one second model function being determined for a second wind-speed bin; determining at least one intersection point value of the measured wind direction where the first model function and the second model function intersect; and outputting (Continued)

the intersection point value as an installation angle of the wind vane.

14 Claims, 2 Drawing Sheets

(51) Int. Cl.
*G01P 21/00* (2006.01)
*F03D 7/02* (2006.01)

(52) U.S. Cl.
CPC ....... *F05B 2200/12* (2013.01); *F05B 2260/80* (2013.01); *F05B 2260/83* (2013.01); *F05B 2270/32* (2013.01); *F05B 2270/321* (2013.01); *F05B 2270/802* (2013.01)

(56) References Cited

U.S. PATENT DOCUMENTS

| | | | | |
|---|---|---|---|---|
| 7,244,100 | B2* | 7/2007 | Yoshida | F03D 7/0204 |
| | | | | 415/4.3 |
| 8,037,748 | B2* | 10/2011 | Enevoldsen | F03D 7/0204 |
| | | | | 73/170.01 |
| 8,310,073 | B2* | 11/2012 | Enevoldsen | F03D 7/0204 |
| | | | | 290/44 |
| 9,982,656 | B2* | 5/2018 | Li | F03D 7/0204 |
| 10,436,174 | B2* | 10/2019 | Holtom | G01S 17/95 |
| 2005/0042093 | A1* | 2/2005 | Yoshida | G01P 5/06 |
| | | | | 416/41 |
| 2012/0263591 | A1* | 10/2012 | Kwong | F03D 17/00 |
| | | | | 416/9 |
| 2014/0348650 | A1 | 11/2014 | Hansen | |
| 2016/0146195 | A1* | 5/2016 | Holtom | F03D 7/0204 |
| | | | | 356/28 |
| 2016/0298607 | A1 | 10/2016 | Gregg et al. | |
| 2017/0268484 | A1* | 9/2017 | Li | F03D 7/0204 |
| 2017/0284375 | A1 | 10/2017 | Nielsen | |
| 2018/0003153 | A1* | 1/2018 | Damgaard | F03D 7/0204 |
| 2019/0323482 | A1* | 10/2019 | Mittelmeier | F03D 17/00 |

FOREIGN PATENT DOCUMENTS

| | | |
|---|---|---|
| DE | 102016100647 | 8/2017 |
| DE | 102016121961 | 5/2018 |
| EP | 1505299 | 2/2005 |
| EP | 1508691 | 2/2005 |
| EP | 1793123 | 6/2007 |
| EP | 2154362 | 2/2010 |
| EP | 3225838 | 10/2017 |
| KR | 10-1383792 | 4/2014 |
| WO | WO 2012/089214 | 7/2012 |
| WO | WO 2016/008500 | 1/2016 |
| WO | WO 2017/178027 | 10/2017 |

OTHER PUBLICATIONS

Official Action for German Patent Application No. 102018001270.1, dated Jan. 7, 2019, 7 pages.
Extended Search Report for European Patent Application No. 19157532.3, dated Jul. 10, 2019, 5 pages.

* cited by examiner

METHOD AND SYSTEM FOR CALIBRATING A WIND VANE

CROSS-REFERENCE TO RELATED APPLICATIONS

This application claims the benefit of German Patent Application No. DE 10 2018 001 270.1 filed Feb. 19, 2018, the entire contents of which are incorporated herein by reference.

FIELD OF THE INVENTION

The present invention relates to a method and a system for calibrating a wind vane of a wind turbine, and to a method for monitoring a wind turbine, a method for operating a wind turbine, a computer program, and a computer-readable medium.

BACKGROUND OF THE INVENTION

In order to obtain an optimal yield with little loading of a wind turbine, the optimal alignment of a rotor of the wind turbine in relation to the wind is sought. Usually, a nacelle carrying the rotor is aligned in relation to the wind on the basis of the wind direction determined by means of a wind vane. A wind vane that operates incorrectly, for example because of age-related bearing damage or incorrect installation, for instance with incorrect alignment, provides incorrect measurement values, so that optimal alignment of the rotor against the wind is not possible.

Usually, the wind vane is mounted on the nacelle. As a result, the wind direction can only be determined in a point-wise manner, and behind the rotor. Owing to the turbulences generated by the rotor, and in particular the swirl and the dimensions of the rotor, such a measurement of the wind direction thus becomes falsified, or is not representative of the wind direction from which the wind is incident upon the rotor area. Moreover, owing to the variable rotor rotational speed and the variable angles of attack of the rotor blades, the generated turbulences vary, so that the wind direction determined by the wind vane behind the rotor is also changed, without a change in the actual wind direction from which the wind is incident upon the rotor.

Usually, to compensate for these falsifications, time-consuming series of measurements are performed, in order to determine correction factors with which the wind direction determined by the wind vane can be corrected.

SUMMARY OF THE INVENTION

All of these methods are relatively elaborate and imprecise, such that the effect of the turbulences, or swirl, upon the measured wind direction cannot be ascertained with precision, or can be ascertained only with a very large amount of effort.

The publication DE 10 2016 100 647 A1 relates to a method for operating a wind turbine, wherein a load occurring on three adjustable rotor blades of a rotor of the wind turbine is sensed during passage through two defined circle sectors. From load peaks, for each of the three rotor blades, differences that occur between the passages through the circle sectors are determined, and a yaw angle of a nacelle of the wind turbine is corrected on the basis of the differences.

It is an object of the invention to enable the nacelle of a wind turbine to be aligned in a precise manner. In particular, it is an object of the invention to correct an incorrect indication of a wind vane.

This object is achieved by a method and a system for calibrating a wind turbine, a method for monitoring a wind turbine and a method for operating a wind turbine according to the independent claims. Advantageous designs are provided by the dependent claims.

A first aspect of the invention relates to a method for calibrating a wind vane of a wind turbine that is arranged, together with two anemometers, on a leeward side of the wind turbine. The method comprises the following work steps: (i) measuring a first wind speed by means of a first anemometer, a second wind speed by means of a second anemometer, and a wind direction by means of the wind vane, a multiplicity of measurement values being recorded over a defined time period; (ii) determining differences between the first wind speed and the second wind speed at least substantially at the same instants in each case; (iii) determining a model function for a relationship between measured wind directions and determined differences that correspond at least substantially to the same instants, at least one first model function being determined for a first wind-speed bin and at least one second model function being determined for a second wind-speed bin; (iv) determining at least one intersection point value of the measured wind direction at which the first model function and the second model function intersect; (v) outputting the intersection point value as an installation angle of the wind vane.

A second aspect of the invention relates to a method for calibrating a wind vane of a wind turbine that is arranged, together with two anemometers, on a leeward side of a rotor of the wind turbine. The method comprises the following work steps: (i) measuring a first wind speed by means of a first anemometer, a second wind speed by means of a second anemometer, and a wind direction by means of the wind vane, a multiplicity of measurement values being recorded over a defined time period; (ii) determining differences between the first wind speed and the second wind speed at least substantially at the same instants in each case; (iii) determining a model function for a relationship between measured wind directions and determined differences that correspond at least substantially to the same instants, for a wind-speed bin; (iv) determining a value of the measured wind direction at which the model function assumes a predefined difference value, in particular at least substantially zero; and (v) outputting the determined value as an installation value of the wind vane.

Within the meaning of the invention determining differences at least substantially at the same instants in each case is, in particular, determining differences between the measured first and second wind speed, each difference being determined on the basis of at least two measurement values, which were recorded at least substantially at the same instant. Preferably, the differences between the first and second wind speed are determined on the basis of differences between mean values for the first and second wind speed, which are formed from the multiplicity of measurement values, in order to minimize the effect of measurement noise. The mean values in this case are preferably formed over averaging intervals of at least 10 s, preferably at least 30 s, in particular approximately 1 min.

Within the meaning of the invention determining a model function is, in particular, ascertaining coefficients, preferably regression coefficients, of a model on which the model function is based. A model function may be determined, for example, by means of a fit of measurement values.

A difference between the first and second wind speed may be assigned, in particular in a precise manner, in particular to any measured wind direction, on the basis of a model function within the meaning of the invention.

Within the meaning of the invention a wind-speed bin is, in particular, a wind-speed interval. Recorded measurement values may be assigned to a wind-speed bin, in that a wind speed measured at least substantially at the same instant, or a corresponding mean value of a plurality of wind-speed measurements, are assigned to the corresponding wind-speed bin. In particular, tuples of measurement values that were recorded at least substantially at the same instant may be assigned to a wind-speed bin on the basis of at least one measurement value for a wind speed that is contained in the tuple.

Within the meaning of the invention an installation angle of a wind vane is, in particular, a difference angle between a rotor axis of the rotor of the wind turbine and a defined alignment of the wind vane, for which the wind vane outputs measurement values of 0°. An installation angle may denote, in particular, a misalignment of the wind vane caused by an installation error, for instance a deviation of the alignment of the wind vane from the rotor axis.

Within the meaning of the invention measured wind directions and determined differences corresponding at least substantially to the same instants are, in particular, wind directions and differences that in each case can be assigned at least substantially to the same instants or averaging intervals, i.e. whose measurement values in each case were recorded at least substantially at the same instant or averaged in the same averaging interval. For example, a wind direction and a difference may correspond to an instant if the corresponding measurement value for the wind direction and the measurement values for the wind speeds, from which the difference is formed, were recorded at least substantially at the same instant. Another wind direction and another difference correspond to another instant if the corresponding other measurement value and the other measurement values for the wind speeds were recorded at least substantially at the other instant.

The invention is based, in particular, on the knowledge that the difference between two wind speeds that are measured in the case of two different anemometers, arranged on a leeward side of a rotor of a wind turbine, receiving incident flow from a direction parallel to a rotor axis of the rotor, is at least substantially independent of the wind strength.

For example, a difference for a first wind-speed bin, determined on the basis of measurement values of the anemometer, for instance in the case of a wind speed of between 5 m/s and 6 m/s, corresponds at least substantially to a difference determined for a second wind-speed bin, for instance in the case of a wind speed of between 6 m/s and 7 m/s.

This difference occurs because a decrease in the wind speed behind the rotor depends primarily on the radial position of the rotor at which the wind passes through the rotor plane.

If the wind direction on the leeward side of the rotor is parallel to the rotor axis, the anemometer always receives incident flow from the same radial position.

Therefore, by determining at least one model function for the relationship between wind directions measured by means of a wind vane and determined differences between the measured wind speeds, a deviation between the measured wind direction and the direction from which the anemometer actually receives incident flow can be ascertained with precision.

For example, the installation error can be ascertained determined from an intersection point of two model functions that were determined for two different wind-speed bins. At the intersection point, the difference between the two measured wind speeds is equal, which corresponds to the two anemometers receiving incident flow from a direction parallel to the rotor axis. The wind direction assigned to the intersection point therefore specifies the installation angle of the wind vane in a precise manner.

Alternatively, it is possible to ascertain, as an installation error of the wind vane, that measured wind direction at which the model function assumes a predefined difference value, in particular becomes zero. The predefining of such a difference value may be appropriate, for example, if the two anemometers output differing measurement values even in the case of an equal strength of incident flow, for instance due to design, owing to the relative positioning of the anemometers in relation to the rotor. The difference value may be predefined, in particular, as zero, if the anemometers are of the same structural design and/or are arranged symmetrically, in particular at the same distance, in relation to the rotor axis, in particular if, in the case of the anemometers receiving incident flow from a direction parallel to the rotor axis, equal wind speeds are measured, owing to the arrangement of the anemometers.

Overall, the invention allows a precise alignment of a nacelle of a wind turbine, in particular the correction of an incorrect indication of the wind vane.

In a preferred embodiment, the model on which the model function is based is linear. The model function can thereby be determined in a reliable manner with little computing complexity. The method according to the invention therefore provides the installation angle in a rapid and reliable manner.

In a further preferred embodiment, the model function is determined on the basis of a compensation calculation, in particular a regression analysis. Preferably in this case, regression coefficients of the model function are determined by the method of least error squares. The model function, in particular the regression coefficients, may be determined, for example, by a fit of the measured wind directions and the associated determined differences. This makes it possible to determine a model function that reliably specifies the relationship between measured wind direction and determined differences, and the evaluation of which, in particular in combination with at least one further model function, permits a precise ascertainment of the installation angle.

In a further preferred embodiment, more than two model functions are determined. Preferably, the installation angle of the wind vane is output as a mean value from a plurality of determined intersection point values of the measured wind direction, at which respectively two model functions for different wind-speed bins intersect. Preferably, the median is ascertained as the mean value. Alternatively, however, the mean value may also be, for example, the arithmetic mean.

In the ascertainment of the mean value, preferably at least one further statistical quantity, in particular a standard deviation, a maximum intersection point value or a minimum intersection point value, is determined and output together with the installation angle. These further statistical quantities may advantageously be entered into a feedback control of the alignment of the nacelle, for example in that feedback control intervals or reaction times of the feedback control are ascertained in dependence on the statistical quantities. In particular, a wind turbine may be operated with the at least one further statistical quantity being taken into account. Upon a change in the wind direction, the alignment of the nacelle can thereby be performed in a particularly precise and reliable manner.

In a further preferred embodiment, for the purpose of measuring the first wind speed, the multiplicity of measurement values generated by the first anemometer are corrected with a first correction function and/or, for the purpose of measuring the second wind speed, the multiplicity of measurement values generated by the second anemometer are corrected with a second correction function. The first and/or second correction function may be, in particular, a respective transfer function, by means of which a windward-side wind speed on a windward side of the rotor can be measured on the basis of a windward wind speed measured on the leeward side. For example, the measured wind speed can thereby be corrected in respect of influences of the rotor upon the wind speed. Alternatively or additionally, the first and/or second correction function may be configured to adapt wind speeds, measured by the first and/or second anemometer, to the respective design of the anemometer, or to the respective anemometer type and/or to a spatial arrangement of the two anemometers relative to each other, in particular relative to the rotor axis and/or to the wind vane. In this way, design-related and possibly metrologically unfavorable spatial arrangements of the anemometers can be compensated for, and/or wind speeds can be ascertained in a particularly precise manner, rendering possible as a result a particularly precise ascertainment of the installation angle.

In a further preferred embodiment, mean values are in each case formed, from the measurement values recorded over the defined time period, for the first wind speed, for the second wind speed and the wind direction. In particular the differences between the first and second wind speed may be determined on the basis of mean values for the first and second wind speed. The mean values in this case may denote the first and second wind speed and the wind direction, in predefined averaging intervals in each case. Preferably, in this case the averagings are performed over averaging intervals of at least 10 s, in particular at least 30 s, preferably approximately 60 s. The influence of measurement noise can thereby be reliably avoided, or at least reduced, such that the wind vane can be calibrated in a precise manner. It is advantageous in this case, in particular, to select the averaging intervals such that they are not significantly longer than 10 min., in particular are shorter than 5 min., preferably shorter than 2 min., so that an incorrect setting of the wind vane can be ascertained rapidly and corrected if necessary.

In a further preferred embodiment, the method furthermore comprises the following work step: aligning the nacelle on the basis of wind directions, measured by means of the wind vane, and the output installation angle. If the installation angle is known, it or a misalignment of the nacelle possibly resulting therefrom may be taken into account in the feedback control of the alignment of the nacelle. A particularly precise alignment of the nacelle is thereby rendered possible. A third aspect of the invention relates to a method for monitoring a wind turbine having a wind vane that, together with two anemometers, is arranged on a leeward side of a rotor of the wind turbine. The method comprises the following work steps: (i) cyclically executing the method according to the first or second aspect of the invention; (ii) determining a calibration quality on the basis of a time progression of the cyclically output installation angle.

Within the meaning of the invention cyclically executing is, in particular, repeatedly executing the method according to the first or second aspect of the invention for different, in particular, successive, time periods. For example, the method according to the first or second aspect of the invention may be executed several times over an operating period of several years, with measurement data of the two anemometers and of the wind vane being recorded, for a predefined time period of, for example, one month, in each case.

Within the meaning of the invention a calibration quality is, in particular, a measure of the reliability of the alignment of the nacelle of the wind turbine as a function of a wind direction measured by means of the wind vane. The calibration quality may depend, for example, on the absolute deviation, preferably averaged over a time interval, of the output installation angle from a predefined reference angle, in particular zero. Alternatively, the calibration quality may depend, for example, on an installation angle that is output cumulatively in succession.

In particular, it can be determined, on the basis of the cyclically output installation angle, whether a misalignment of the nacelle is increasing. This may be an indication of a malfunction associated with the ageing of components of the wind turbine. For example, wear phenomena in a bearing of an anemometer or of the wind vane may result in a deterioration of the calibration quality, or a drift of a defined alignment of the nacelle caused by an aged alignment mechanism. By means of the method according to the invention, such malfunctions can be identified, and countermeasures can be implemented, so that reliable alignment of the nacelle at any time is made possible.

A fourth aspect of the invention relates to a method for operating a wind turbine having a nacelle, arranged on a tower, a rotor and a wind vane that is arranged, together with two anemometers, on a leeward side of the rotor. The method comprises the following work steps: (i) ascertaining an installation angle by means of a method according to the method according to the first or second aspect of the invention; (ii) adjusting the wind vane on the basis of the output installation angle; and (iii) aligning the nacelle on the basis of wind directions measured by means of the adjusted wind vane. A precise alignment of the nacelle is rendered possible by the adjusted wind vane.

Within the meaning of the invention adjusting the wind vane is, in particular, mechanical adjusting, which is preferably achieved by a manual realignment, or a correction, of the alignment of the wind vane relative to the rotor axis. Alternatively or additionally, however, adjusting may also be electronic adjusting, which is preferably implemented by taking account of the output installation angle in a feedback control of the alignment of the nacelle. In particular, a defined alignment of the wind vane, in which the wind vane output the value 0°, may be undefined on the basis of the output installation angle.

A fifth aspect of the invention relates to a computer program, which comprises instructions that, when they are executed by a computer, cause the latter to execute the steps of a method according to the first, second, third or fourth aspect of the invention.

A sixth aspect of the invention relates to a computer-readable medium, on which a computer program according to the fifth aspect of the invention is stored.

A seventh aspect of the invention relates to a system for calibrating a wind vane of a wind turbine having a wind vane for measuring a wind direction, a first anemometer for measuring a first wind speed, a second anemometer for measuring a second wind speed, and a control facility. Preferably, the wind vane, the first anemometer and the second anemometer are arranged on the leeward side of a rotor of the wind turbine. Further, preferably, the control facility has: (i) a means for recording a multiplicity of measurement values of the first and second anemometers and of the wind vane over a predefined time period; (ii) a means for determining differences between the first wind speed and the second wind speed at respectively at least substantially the same instants; (iii) a means for determining a first model function for a relationship between wind directions, measured by means of the wind vane, and determined differences that correspond, at least substantially, to the same instants, for a first wind-speed bin; (iv) a means for determining a second model function for a relationship between wind directions, measured by means of the wind vane, and determined differences that correspond, at least substantially, to the same instants, for a second wind-speed bin; (v) a means for determining at least one intersection point value of the measured wind direction at which the first model function and the second model function intersect; and (vi) an interface, which is configured to output the at least one determined intersection point value as an installation angle of the wind vane.

The first anemometer, the second anemometer and/or the wind vane are/is preferably configured to output the measurement values for the measured wind speeds, or wind direction, such that they can be recorded by the control facility. The control facility preferably has a memory for recording the measurement values, and a processor for processing the measurement values. The means for recording, for determining differences, for determining a first and second model function, and for determining at least one intersection point value may be realized, in particular, as one or more software modules, which preferably form the computer program according to the fifth aspect of the invention.

In a preferred embodiment, the first anemometer and the second anemometer are arranged, together with the wind vane, in a plane perpendicular to the rotor axis of the rotor. Preferably, the first and second anemometer are arranged, together with the wind vane, on a common structure on the nacelle, in particular on a measurement mast of the nacelle. This makes it possible, in particular, for measurement values generated by the first and second anemometer and the wind vane to be recorded easily, at least substantially simultaneously. In addition, with this arrangement the installation angle can be ascertained in a particularly precise manner, since turbulences generated by the rotor thus affect the measurements with an equal intensity.

In a further preferred embodiment, the first anemometer and the second anemometer are arranged at a distance from each other. Preferably, the first anemometer and the second anemometer are arranged with an offset in the horizontal direction. This makes it possible for the differences between wind speeds measured by means of the first and second anemometer to be of sufficient magnitude to determine a model function that, in a particularly precise manner, reflects the relationship between wind directions and the differences.

The first anemometer and the second anemometer in this case may preferably be arranged in a plane, in particular in a plane perpendicular to the rotor axis of the rotor. Further, preferably, the first anemometer and the second anemometer may be arranged equidistantly in relation to the wind vane. Alternatively, however, the first anemometer and the second anemometer may also be arranged asymmetrically in relation to the rotor axis and/or the wind vane. In particular, the second anemometer may be arranged at a different distance from the wind vane than the first anemometer.

In particular, the wind vane may be arranged asymmetrically in relation to the rotor axis, such that, with the anemometers arranged symmetrically in relation to the rotor axis, differing distances are obtained between the anemometers and the wind vane.

In a further preferred embodiment, the first anemometer is realized so as to be structurally identical to the second anemometer. It can thereby be made certain that the determined differences between the first and second wind speed are caused substantially by turbulences, or the swirl effect, generated at the rotor.

The features and advantages described in relation to the first aspect of the invention and its advantageous design are also applicable, at least where technically appropriate, to the second, third, fourth, fifth, sixth and seventh aspect of the invention and its advantageous design, and vice versa.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The invention is explained in greater detail in the following on the basis of non-limiting exemplary embodiments, which are represented in the figures. There are shown therein, at least partly in schematic form.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
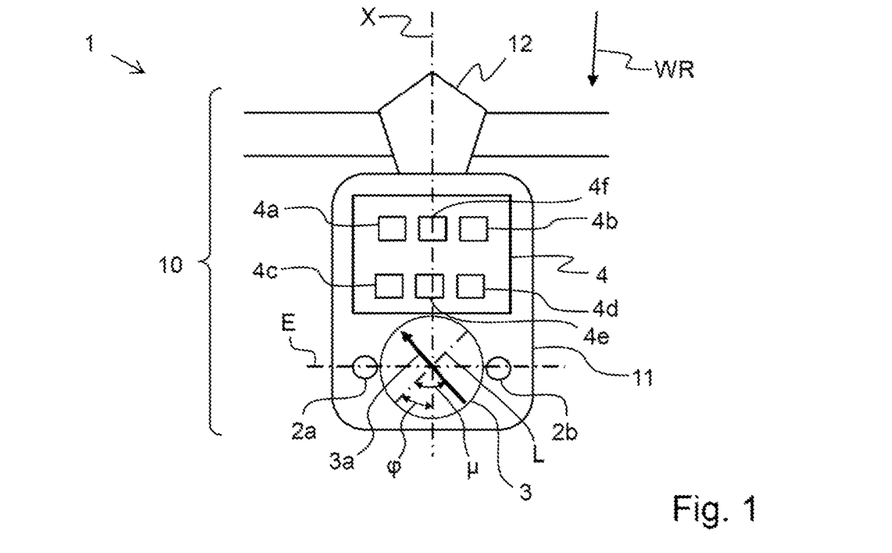
FIG. 1 a preferred exemplary embodiment of a system according to the invention.

FIG. 1 shows a preferred exemplary embodiment of a system 1 according to the invention, having a first anemometer 2a for measuring a first wind speed, a second anemometer 2b for measuring a second wind speed, a wind vane 3 for measuring a wind direction $\mu$, and a control facility 4, which is connected to the two anemometers 2a, 2b and to the wind vane 3.

The two anemometers 2a, 2b and the wind vane 3 are preferably arranged on a nacelle 11 of a wind turbine 10, the nacelle carrying a rotor 12 that has at least two, in particular three, rotor blades. The anemometers 2a, 2b and the wind vane 3 in this case may be arranged, in particular, on a leeward side of the rotor 12. The wind that is incident upon the rotor 12 on the windward side, from a wind direction WR, is deflected by the rotor 12, so that the wind direction $\mu$ measured by the wind vane 3 does not correspond to the windward-side wind direction WR.

Usually, the wind vane is unintentionally aligned at an installation angle $\varphi$ relative to a rotor axis X of the rotor 12. The installation angle $\varphi$ corresponds, in particular, to the angle between the rotor axis X and a defined alignment L of the wind vane 3, to which wind directions output by the wind vane 3 relate. The defined alignment L is distinguished, in particular, in that the wind vane, when a wind vane 3a of the wind vane 3 is aligned along the defined alignment L, outputs the value 0° for the measured wind direction $\mu$.

In the example shown, the wind vane 3a is aligned at about 45° relative to the rotor axis X. However, owing to the misalignment, corresponding to the installation angle $\varphi$, the wind vane 3 outputs the value 90°.

The installation angle $\varphi$ can be ascertained when the wind direction $\mu$ is incident upon the wind vane along the rotor axis X, since in this case the installation angle $\varphi$ is equal to the wind direction $\mu$, i.e. equal to the value output by the wind vane 3. The presence of this case can be identified on the basis of wind speeds measured by means of the anemometers 2a, 2b, since in the case of an incident flow from a direction parallel to the rotor axis X, even for differing wind strengths, the difference between the wind speed measured by means of the first anemometer 2a and the wind speed measured by means of the second anemometer is substantially constant.

Preferably, the two anemometers 2a, 2b are arranged, together with the wind vane 3, in a plane E, which is perpendicular to the rotor axis X. Further, preferably, the two anemometers 2a, 2b are each arranged at the same distance from the wind vane 3. In particular, the two anemometers 2a, 2b may be arranged symmetrically with respect to the rotor axis X. It is furthermore preferred to arrange the two anemometers 2a, 2b as far apart from each other as possible, for instance at a distance of at least 1 m, preferably at least 2 m, in particular at least 3 m, such that it can be ensured that the anemometers 2a, 2b can receive a different incidence of the wind deflected at the rotor 12.

The control facility 4 preferably has a means 4a for recording a multiplicity of measurement values of the first and second anemometer 2a, 2b and of the wind vane 3, which are generated by the anemometers 2a, 2b and the wind vane 3 over a defined time period, and made available. The control facility 4 further preferably has a means 4b for determining differences between the first wind speed and the second wind speed at at least substantially the same instants in each case. The anemometers 2a, 2b in this case are preferably synchronized, i.e. configured to generate measurement values substantially synchronously, such that, at that instant at which a measurement value is in each case generated by the anemometers 2a, 2b, the means 4b for determining differences can determine the difference between the first and second measured wind speed. The measurement values provided by the anemometers 2a, 2b and the wind vane 3 are preferably time-averaged before being processed further in the control facility 4. Preferred averaging intervals are, in particular, at least 10 s, preferably at least 30 s, in particular approximately 1 minute.

Alternatively or additionally, the means 4a for recording a multiplicity of measurement values may be configured to record synchronously in each case a last-generated measurement value from the first and second anemometer 2a, 2b. Preferably, the two anemometers 2a, 2b in this case generate the measurement values at a high frequency, for example with a frequency greater than 5 Hz, preferably greater than 1 Hz.

Preferably, the control facility 4 additionally has a means 4c for determining a first model function for a relationship between wind directions $\mu$, measured by means of the wind vane, and determined differences that correspond, at least substantially, to the same instants, for a first wind-speed bin.

The control facility 4 preferably has a means 4d for determining a second model function for a relationship between wind directions µ, measured by means of the wind vane, and determined differences that correspond, at least substantially, to the same instants, for a second wind-speed bin. The means 4c for determining a first model function and the means 4d for determining a second model function may preferably be part of a higher-order means for determining model functions for relationships between measured wind directions and determined wind-speed differences for different wind-speed bins.

The means 4c, 4d for determining a first and second model function are preferably configured to find a mathematical relationship for the dependence of the determined wind-speed differences on the measured wind direction µ in respectively one wind-speed bin. The means 4c, 4d may be configured, for example, to perform a compensation calculation, within which the model function is based, in particular, on a linear model. The means 4c, 4d may be configured, for instance, to approximate the dependence of the wind-speed differences on the measured wind directions µ with a linear fit.

For example, the relationship between the measured wind direction and determined differences may be described by a linear regression model $\Delta_i = \beta_{0i} + \beta_{1i} \cdot \mu$, wherein $\Delta_i$ is the wind-speed difference, µ is the measured wind direction, and $\beta_{0i}, \beta_{1i}$ are regression coefficients to be ascertained. The index i in this case specifies the wind-speed bin.

The control facility 4 preferably furthermore has a means 4e for determining at least one intersection point value of the measured wind direction µ, at which the first model function and the second model function intersect, and an interface 4f, the interface being configured to output the at least one determined intersection point value as an installation angle φ of the wind vane 3.

The means 4e for determining at least one intersection point value may be configured, in particular, to equate the determined model functions, in order to ascertain the intersection point value, which characterizes a measured wind direction. The intersection point value is preferably obtained as $\mu = (\beta_{0j} - \beta_{0i})/(\beta_{1i} - \beta_{1j})$, wherein the index i denotes the first wind-speed bin i and the index j denotes the second wind-speed bin j.

The wind direction µ characterized by the determined intersection point value corresponds to a wind direction in which the wind deflected by the rotor 12 is substantially parallel to the rotor axis X. This is because, irrespective of the strength of the wind acting upon the rotor, in this case the difference between the wind strength measured by the first anemometer 2a and the wind strength measured by the second anemometer 2b is constant. The intersection point of the model functions for two different wind-speed bins therefore denotes a wind direction that corresponds to an installation angle φ of the wind vane 3.

Figure 2:
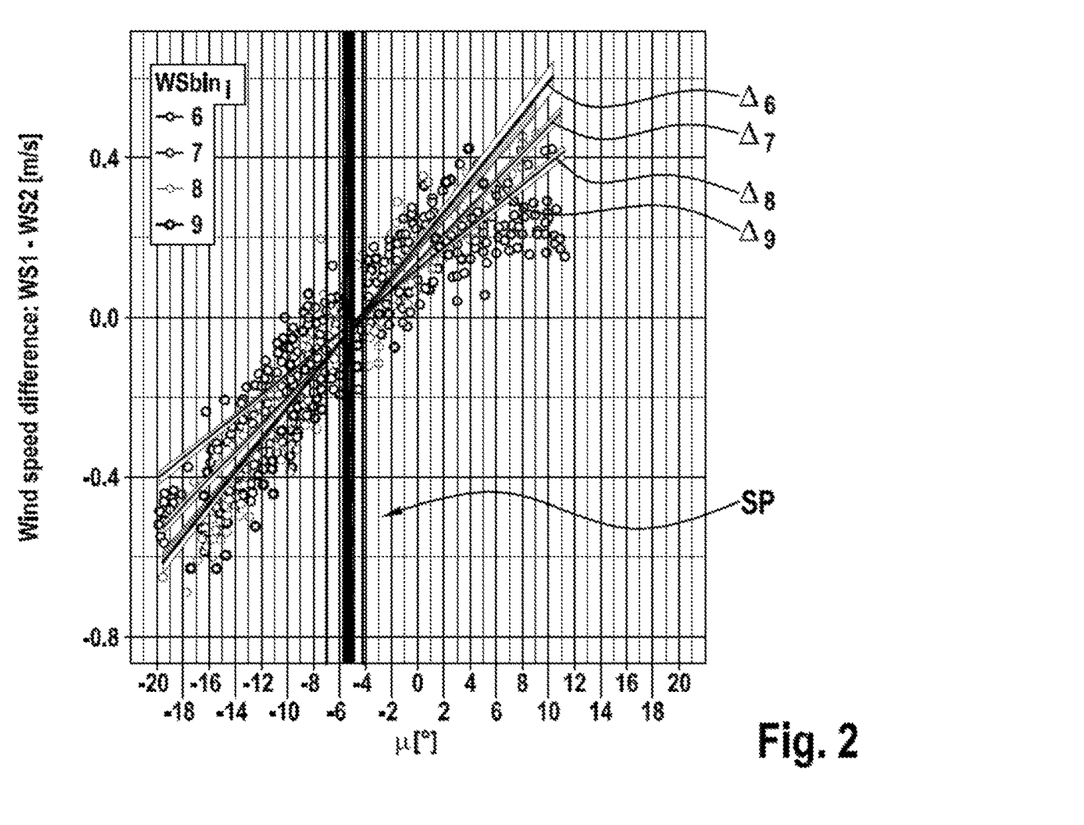
FIG. 2 a preferred exemplary embodiment of a plurality of model functions.

FIG. 2 shows a preferred exemplary embodiment of a plurality of model functions $\Delta_i$ with i=6, 7, 8, 9 of a relationship between wind directions µ, measured by means of a wind vane, and determined differences between wind speeds WS1, measured by means of a first anemometer, and wind speeds WS2, measured by means of a second anemometer, with measurement values for the wind directions µ and the wind speeds WS1, WS2 preferably being recorded over a defined, in particular predefined, time period on a nacelle of a wind turbine, on the leeward side of a rotor of the wind turbine. The measurement values may be recorded, for instance, as tuples, in particular as 3-tuples, such that in each case a wind direction µ, measured at least substantially at the same instant, a first measured wind speed WS1 and a second measured wind speed WS2 are assigned to each other.

The measurement values for the wind speeds WS1, WS2, in particular a mean value of the first and second wind speed WS1, WS2 of a tuple, are preferably assigned to differing wind-speed bins i, and the model functions $\Delta_i$ in each case determined on the basis of all measurement values assigned to a wind-speed bin i. For example, all measurement values that were recorded at instants at which the mean measured wind speed was between 5 m/s and 6 m/s are assigned to a wind-speed bin i=6, while all measurement values that were recorded at instants at which the mean measured wind speed was between 6 m/s and 7 m/s are assigned to a wind-speed bin i=7.

The model functions $\Delta_i$ are preferably based on a linear regression model $\Delta_i = \beta_{0i} + \beta_{1i} \cdot \mu$, so that the relationships between measured wind directions µ and determined differences that correspond substantially to the same instants are ascertained by two regression coefficients $\beta_{0i}, \beta_{1i}$. The regression coefficients $\beta_{0i}, \beta_{1i}$ may be determined, in particular, by a compensation calculation, for example a fit of the measurement values.

On the assumption that, in the case of a wind direction µ in which the wind flows, on a leeward side of a rotor, along a rotor axis (see FIG. 1), the difference between the wind speeds WS1, WS2, measured by means of the first and second anemometer, is substantially equal for different wind-speed bins i, it is possible to ascertain, from the intersection point value SP of two model functions $\Delta_i$ that angle at which the wind vane is installed on the rotor relative to the rotor axis.

In FIG. 2, the intersection point values SP of each two model functions $\Delta_i$ are indicated by vertical lines. In this case, for a number n of model functions $\Delta_i$, or wind-speed bins i, a number c of intersection point values SP: $c = n \cdot (n-1)/2$ is obtained. Preferably, a mean value, in particular the median, of all intersection point values SP is output as an installation angle of the wind vane. In addition, the maximum intersection point value SP, the minimum intersection point value SP and a standard deviation from the mean value may be output.

Figure 3:
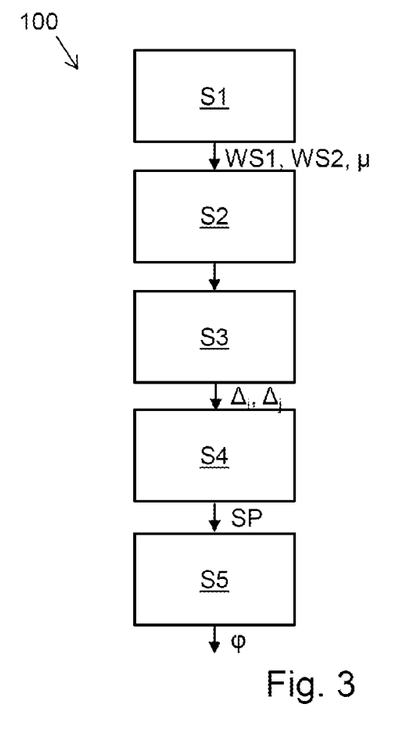
FIG. 3 a preferred exemplary embodiment of a method according to the invention for calibrating a wind vane.

FIG. 3 shows an exemplary embodiment for a method 100 for calibrating a wind vane of a wind turbine, the wind vane being arranged, together with two anemometers, on a leeward side of a rotor of the wind turbine.

In a method step S1, a first wind speed WS1 is measured by means of a first anemometer, a second wind speed WS2 is measured by means of a second anemometer, and a wind direction µ is measured by means of the wind vane. Preferably, for this purpose a multiplicity of measurement values of the first and second anemometer and of the wind vane are recorded over a predefined time period. The measurement values in this case are preferably entered as mean values into a plurality of tuples, in particular 3-tuples, for a first wind speed WS1, a second wind speed WS2 and a wind direction µ, the mean values for the wind speeds WS1, WS2 and the wind direction µ preferably being recorded within substantially the same averaging interval. A preferred averaging interval for the averaging of the measurement values that are entered into a tuple is at least 10 s, preferably at least 30 s, in particular at least 60 s.

In a further method step S2, differences are determined between the first wind speed WS1 and the second wind speed WS2, at at least substantially the same instants in each case. In particular, for each tuple of measurement values, a difference between the two, preferably averaged, wind speeds WS1, WS2 is ascertained.

In a further method step S3, a first model function $\Delta_i$, for a relationship between measured wind directions μ and determined differences that correspond, at least substantially, to the same instants, is determined for a first wind-speed bin i. A second model function $\Delta_j$, for a relationship between measured wind directions μ and determined differences that correspond, at least substantially, to the same instants, is determined for a second wind-speed bin j.

The model functions $\Delta_i$, $\Delta_j$ are preferably each determined on the basis of measurement values that were assigned to the first wind-speed bin i or the second wind-speed bin j on the basis of the wind speeds WS1, WS2, in particular a mean value from the wind speeds WS1, WS2. The assignment in this case may be performed as part of the method step S2 or S3.

The model functions $\Delta_i$, $\Delta_j$ are preferably determined on the basis of a compensation calculation, in particular a regression analysis. Preferably in this case, regression coefficients of the model functions are determined, for example using the method of least error squares.

In a further method step S4, there is determined at least one intersection point value SP of the measured wind direction β at which the first model function $\Delta_i$ and the second model function $\Delta_j$ intersect. For this purpose, preferably, the two model functions $\Delta_i$, $\Delta_j$ are equated and solved for the wind direction μ. In particular, by means of the regression coefficients determined in the preceding method step S3, a value can be calculated for the wind direction μ, which corresponds to the intersection point value SP.

Alternatively, there may be determined, in method step S4, a value of the measured wind direction at which the first model function $\Delta_i$ assumes a predefined difference value, in particular substantially zero. For this purpose, preferably, the model function $\Delta_i$ is equated to the predefined difference value, and solved for the wind direction β.

This may be advantageous, in particular, if the two anemometers are arranged on the leeward side behind the rotor of the wind turbine in such a manner that, if both anemometers receive incident flow from a direction parallel to a rotor axis of the rotor, both anemometers measure the same wind speed, or the deviation of the corresponding measurement values is known.

Since, in this case, the determination of the second model function $\Delta_j$ is not absolutely necessary, it is possible to dispense with the determination of the second model function $\Delta_j$ for the second wind-speed bin j in the method step S3.

In a further method step S5, the determined intersection point value SP, or the determined value, is output as a installation angle φ of the wind vane, in particular relative to a rotor axis of the rotor of the wind turbine. On the basis of the output installation angle φ, the wind vane can be adjusted, and the nacelle of the wind turbine can be aligned on the basis of wind directions μ measured by means of the adjusted wind vane.

Figure 4:
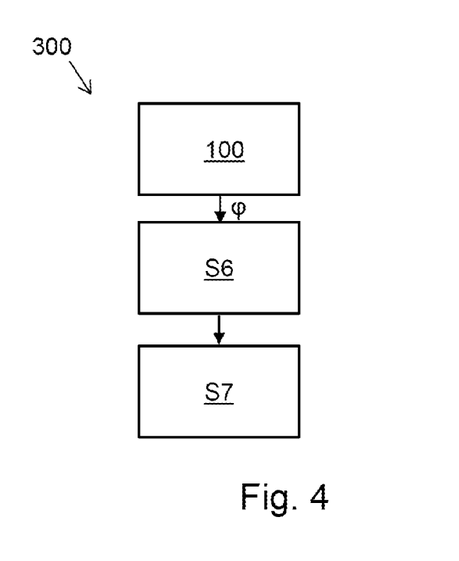
FIG. 4 a preferred exemplary embodiment of a method according to the invention for operating a wind turbine.

FIG. 4 shows a preferred exemplary embodiment of a method 300 according to the invention for operating a wind turbine. In this case, the method 100 according to the invention for calibrating a wind vane, as explained in connection with FIG. 3, is applied.

The installation angle φ output in this case may be used, in a method step S6, to adjust the wind vane. For example, the wind vane may be realigned by a service engineer on a nacelle of the wind turbine, in particular may be rotated about the output installation angle φ. Alternatively, the output installation angle may be taken into account as part of an electronic adjustment in the aligning of the nacelle.

In a further method step S7, the nacelle is aligned on the basis of wind directions measured by means of the adjusted wind vane.

Figure 5:
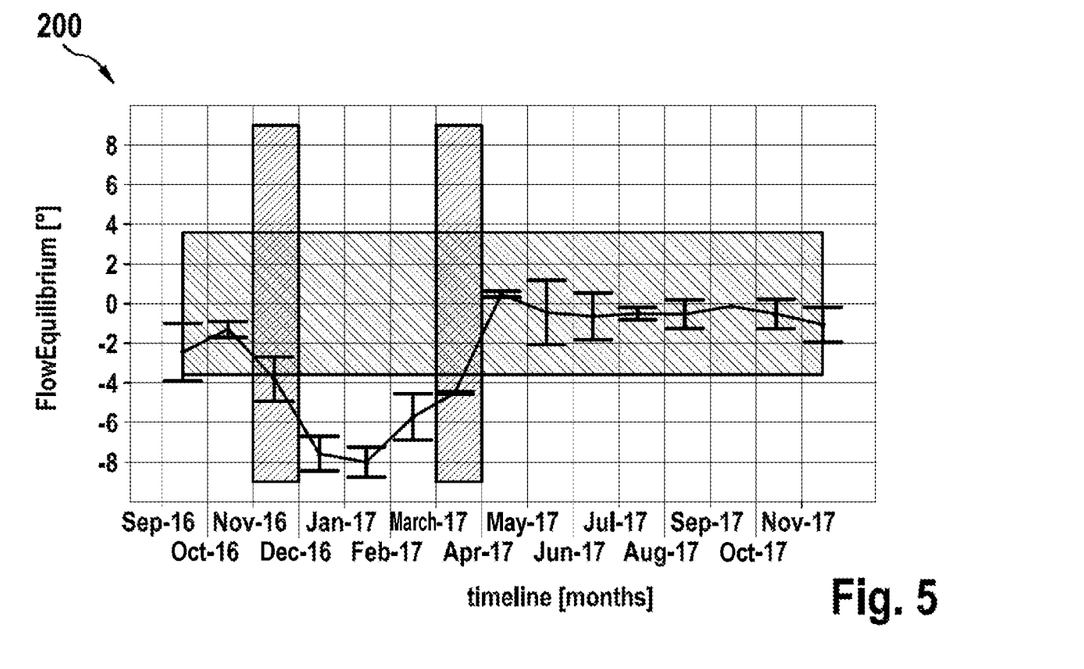
FIG. 5 a preferred exemplary embodiment of a method according to the invention for monitoring a wind turbine.

FIG. 5 shows a preferred exemplary embodiment for a method 200 according to the invention for monitoring a wind turbine, in which an installation angle φ is output cyclically, in particular over an operating period of a wind turbine of 15 months.

In this case, an intersection point value, output as an installation angle φ, is repeated according to the method according to the invention for the purpose of calibrating a wind vane, as described above in connection with FIG. 3. In this particular case, the predefined time period, in which measurement values for a first wind speed of a first anemometer, measurement values for a second wind speed of a second anemometer, and measurement values for a wind direction of a wind vane were recorded, is one month, respectively.

The wind vane was adjusted on the basis of the output installation angles φ for the months September-16 and October-16. At the same time, it was so-called offset, i.e. a constant alignment correction, for the alignment of a nacelle of the wind turbine, was changed, as a result of which the output installation angles φ for the months November-16 to March-17 deviate more from zero. For the months April-17 to November-17, the offset was reset to a value that renders possible an optimal alignment of the nacelle in relation to a wind direction of the wind incident upon a rotor of the wind turbine. The thereupon output installation angles φ lie in a range of between −1° and 1°, which indicates a precisely adjusted wind vane.

A calibration quality can be determined on the basis of the relative changes of the cyclically output installation angles φ in relation to each other. If, over a longer time period, the output installation angles deviate from each other in one direction, i.e. if the output installation angle φ is progressively increased or reduced, the calibration quality is deteriorating. This may be an indication of a defect, for example of a worn bearing of one of the anemometers or of a defective alignment mechanism of the nacelle.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

LIST OF REFERENCES 1 system
2a, 2b first, second anemometer
3 wind vane
3a wind vane
4 control facility
4a means for recording
4b means for determining differences
4c means for determining a first model function
4d means for determining a second model function
4e means for determining an intersection point value
4f interface
10 wind turbine
11 nacelle 12 rotor
100 method for calibrating a wind vane
200 method for monitoring a wind turbine
300 method for operating a wind turbine
S1-S7 method steps
X rotor axis
L defined alignment
E plane
$\Delta_i$, $\Delta_j$ first, second model function
µ measured wind direction
WR windward-side wind direction
WS1, WS2 first, second wind speed
SP intersection point value
φ installation angle

What is claimed is:

1. A method for calibrating a wind vane of a wind turbine that is arranged, together with two anemometers, on a leeward side of a rotor of the wind turbine, comprising:
measuring a first wind speed by means of a first anemometer, a second wind speed by means of a second anemometer, and a wind direction by means of the wind vane, a multiplicity of measurement values being recorded over a defined time period;
determining differences between the first wind speed and the second wind speed at least substantially at the same instants in each case; determining a model function for a relationship between the measured wind directions and the determined differences that correspond at least substantially to the same instants, at least one first model function being determined for a first wind-speed bin and at least one second model function being determined for a second wind-speed bin;
determining at least one intersection point value of the measured wind direction at which the first model function and the second model function intersect;
outputting the intersection point value as an installation angle of the wind vane.

2. The method according to claim 1, a model on which the model function is based being linear.

3. The method according to claim 1, the model function being determined on the basis of a compensation calculation.

4. The method according to claim 1, more than two model functions being determined, and the installation angle of the wind vane being output as a mean value from a plurality of determined intersection point values of the measured wind direction, at which respectively two model functions for different wind-speed bins intersect.

5. The method according to claim 1, the multiplicity of measurement values generated by the first anemometer being corrected with a first correction function, for the purpose of measuring the first wind speed, and/or the multiplicity of measurement values generated by the second anemometer being corrected with a second correction function, for the purpose of measuring the second wind speed.

6. A method for monitoring a wind turbine having a wind vane that, together with two anemometers, is arranged on a leeward side of a rotor of the wind turbine, comprising:
cyclically executing the method according to claim 1;
determining a calibration quality on the basis of a time progression of the cyclically output installation angle.

7. A method for operating a wind turbine having a nacelle, arranged on a tower, a rotor and a wind vane that is arranged, together with two anemometers, on a leeward side of the rotor, which comprises:
ascertaining an installation angle by means of the method according to claim 1;
adjusting the wind vane on the basis of the output installation angle; and
aligning the nacelle on the basis of wind directions measured by means of the adjusted wind vane.

8. A non-transitory computer-readable medium, with computer-executable instructions stored thereon for executing the steps of a method according to claim 1.

9. A method for calibrating a wind vane of a wind turbine that is arranged, together with two anemometers, on a leeward side of a rotor of the wind turbine, comprising:
measuring a first wind speed by means of a first anemometer, a second wind speed by means of a second anemometer, and a wind direction by means of the wind vane, a multiplicity of measurement values being recorded over a defined time period;
determining differences between the first wind speed and the second wind speed at least substantially at the same instants in each case; determining a model function for a relationship between the measured wind directions and the determined differences that correspond at least substantially to the same instants, for a wind-speed bin;
determining a value of the measured wind direction at which the model function assumes a predefined difference value; and
outputting the determined value as an installation value of the wind vane.

10. A system for calibrating a wind vane of a wind turbine having a wind vane for measuring a wind direction, a first anemometer for measuring a first wind speed, a second anemometer for measuring a second wind speed, and a control facility, the wind vane, the first anemometer and the second anemometer being arranged on a leeward side of a rotor of the wind turbine, and the control facility having:
means for recording a multiplicity of measurement values of the first and second anemometers and of the wind vane over a predefined time period;
means for determining differences between the first wind speed and the second wind speed at respectively at least substantially the same instants;
means for determining a first model function for a first relationship between wind directions, measured by means of the wind vane, and determined differences that correspond, at least substantially, to the same instants, for a first wind-speed bin;
means for determining a second model function for a second relationship between wind directions, measured by means of the wind vane, and determined differences that correspond, at least substantially, to the same instants, for a second wind-speed bin;
means for determining at least one intersection point value of the measured wind direction at which the first model function and the second model function intersect; and
an interface, which is configured to output the at least one determined intersection point value as an installation angle of the wind vane.

11. The system according to claim 10, the first anemometer and the second anemometer being arranged, together with the wind vane, in a plane perpendicular to a rotor axis of the rotor.

12. The system according to claim 10, the first anemometer and the second anemometer being arranged at a distance from each other, and the first anemometer and the second anemometer being arranged with an offset in a horizontal direction that is substantially perpendicular to a direction of a gravitational vector.

13. The system according to claim 12, wherein the first anemometer and the second anemometer are equidistant in relation to the wind vane.

14. The system according to claim 10, the first anemometer being realized so as to be structurally identical to the second anemometer.

* * * * *